United States Patent
Chen et al.

(10) Patent No.: US 11,320,338 B2
(45) Date of Patent: May 3, 2022

(54) BRIDGE DETECTING VEHICLE WITH TWO FOLDABLE ARMS

(71) Applicant: Changsha University of Science and Technology, Hunan (CN)

(72) Inventors: Minhui Chen, Hunan (CN); Lairong Yin, Hunan (CN); Hongwei Hu, Hunan (CN); Tianzan He, Hunan (CN); Cong Mao, Hunan (CN); Jinhang Wang, Hunan (CN); Dang Zhou, Hunan (CN); Anwei Jiang, Hunan (CN)

(73) Assignee: Changsha University of Science and Technology, Changsha (CN)

( * ) Notice: Subject to any disclaimer, the term of this patent is extended or adjusted under 35 U.S.C. 154(b) by 137 days.

(21) Appl. No.: 16/904,533

(22) Filed: Jun. 17, 2020

(65) Prior Publication Data

US 2020/0319058 A1    Oct. 8, 2020

Related U.S. Application Data

(63) Continuation of application No. PCT/CN2019/106192, filed on Sep. 17, 2019.

(30) Foreign Application Priority Data

Jan. 14, 2019    (CN) .......................... 201910031489.1

(51) Int. Cl.
| | |
|---|---|
| *G01M 5/00* | (2006.01) |
| *B60P 3/00* | (2006.01) |
| *B62D 33/02* | (2006.01) |
| *E01D 19/10* | (2006.01) |

(52) U.S. Cl.
CPC ............. *G01M 5/0075* (2013.01); *B60P 3/00* (2013.01); *B62D 33/0207* (2013.01); *E01D 19/106* (2013.01); *G01M 5/0008* (2013.01)

(58) Field of Classification Search
CPC ..... G01M 5/0075; G01M 5/0008; B60P 3/00; B62D 33/0207; E01D 19/106
See application file for complete search history.

(56) References Cited

U.S. PATENT DOCUMENTS 4,696,371 A * 9/1987 Moog ................... E01D 19/106
                                                                                182/2.6
5,253,731 A * 10/1993 Moog ................... E01D 19/106
                                                                                182/2.6

FOREIGN PATENT DOCUMENTS

| CN | 2839365 Y | * | 11/2006 |
|---|---|---|---|
| CN | 2839365 Y | | 11/2006 |
| CN | 101624810 A | | 1/2010 |
| CN | 201891076 U | | 7/2011 |
| CN | 104420417 A | | 3/2015 |
| CN | 105113403 A | | 12/2015 |

(Continued)

*Primary Examiner* — Kyle R Quigley
*Assistant Examiner* — Aeysha N Sultana

(57) ABSTRACT

A bridge detecting vehicle with two foldable arms, including: a vehicle body, slewing mechanisms, horizontal and vertical arms and telescopic arms. One end of the two horizontal arms is respectively arranged on the slewing mechanisms, and the other end of the two horizontal arms is respectively connected to the two horizontal arms. A crossed arm is provided between the two horizontal arms. The two vertical arms are respectively connected to the two horizontal arms via ball joints. A detecting device is respectively provided at rear ends of the two telescopic arms.

9 Claims, 4 Drawing Sheets

(56) References Cited

FOREIGN PATENT DOCUMENTS

| | | | |
|---|---|---|---|
| CN | 205046472 U | | 2/2016 |
| CN | 105568851 A | * | 5/2016 |
| CN | 107604814 A | | 1/2018 |
| CN | 207003244 U | | 2/2018 |
| CN | 207419256 U | | 5/2018 |
| CN | 207828780 U | | 9/2018 |
| CN | 108842609 A | * | 11/2018 |
| CN | 108842609 A | | 11/2018 |
| CN | 208362912 U | | 1/2019 |
| CN | 109468948 A | | 3/2019 |
| CN | 109837834 A | * | 6/2019 |
| DE | 1658639 B1 | | 1/1971 |
| JP | 2006002417 A | | 1/2006 |
| KR | 20090126883 A | | 12/2009 |

\* cited by examiner

BRIDGE DETECTING VEHICLE WITH TWO FOLDABLE ARMS

CROSS-REFERENCE TO RELATED APPLICATIONS

This application is a continuation of International Application No. PCT/CN2019/106192, filed on Sep. 17, 2019, which claims the benefit of priority from Chinese Patent Application No. 201910031489.1, filed on Jan. 14, 2019. The content of the aforementioned applications, including any intervening amendments thereto, are incorporated herein by reference.

TECHNICAL FIELD

This application relates to bridge detection devices, and more particularly to a bridge detecting vehicle with two foldable arms.

BACKGROUND OF THE DISCLOSURE

Bridges are one of the important infrastructures and the bridge engineering greatly facilitates coordinative development of society and economy. As the bridge constructions rapidly develop, more attentions are paid to the safety and durability of bridges due to the huge capital investment. However, the bridge will encounter the aging. Therefore, the bridge detection should be emphasized, and the precision and efficiency of the detection can be greatly improved using advanced bridge detection vehicles. The bridge detection vehicle, including a chassis and an operation arm is the specialized vehicle for the bridge detection. During the operating, the operation arm is bent through the hydraulic system to reach the bridge bottom to carry out the bridge detection.

There are a lot of commercially available bridge detection vehicles, and a lot of improvements are made. However, there are still many defects.

For example, Chinese Patent No. 201891076 U discloses a dual-mode bridge detection vehicle to improve the bridge detection vehicle, in which a stabilization system and an image acquisition and analysis system for scanning, analyzing and transmitting bridge appearances are added. The stabilization system prevents the bridge detection vehicle from overturning, and the image acquisition and analysis system scans the bridge rapidly and conveniently. The bridge detection vehicle of this disclosure is able to achieve both the automatic detection and the manual detection. However, there are some defects such as a low work efficiency of the single arm, large secondary stress of the truss and a bending moment at nodes.

Chinese Patent No. 207003244 U discloses a vehicle for bridge detection with double safety passages. Two safety passages which are capable of being independently unfolded are connected to a lower end of a safety passage fixing mechanism. The two safety passages are foldable relative to the safety passage fixing mechanism, so that multiple points can be simultaneously detected, thereby improving the work efficiency. However, the safety of workers cannot be ensured during the detection since the two independent safety passages are not stable.

Chinese Patent No. 207828780 U discloses a bridge detector, in which an intelligent detector is provided. The bridge detector is only used for the bridge detection, and the bridge is not repaired during the detection. The detection workers are not required to go to the bottom of the bridge for the detection, and repairing plans are made after the detected data are summarized and analyzed, improving the safety of workers and having a low cost. However, some defects still exist, the foldable single arm of the bridge detector is not capable of detecting two or more points at the same time, and some dead points cannot be reached.

Therefore, the commercially available bridge detection vehicles, especially the foldable arms may be unstable. Also, these bridge detection vehicles are clumsy. Trussed bridge detecting vehicles are costly and have a complicated structure. In addition, the low work efficiency is caused due to the single arm, and meanwhile, some dead points, such as inner sides of bridge piers and dead points of the top structure of the bridge, are not detectable due to the degree of freedom of the existing arms. Moreover, potential safety hazards may occur when the workers carry out the detection under the bridge.

SUMMARY OF THE DISCLOSURE

The disclosure provides a bridge detecting vehicle with two foldable arms to overcome the defects mentioned above.

The disclosure provides a bridge detecting vehicle with two foldable arms, comprising:
 a vehicle body;
 a first slewing mechanism;
 a first foldable arm assembly;
 a second foldable arm assembly;
 a crossed arm; and
 a detecting device;
 wherein the first slewing mechanism is mounted on one side of a chassis of the vehicle body, close to a front of the vehicle body, through bolted connection, so as to allow the folded foldable arm assemblies to be placed at the chassis of the vehicle body, and prevent the folded foldable arm assemblies from interfering an anti-overturn device;
 the first foldable arm assembly comprises a second slewing mechanism, a first support base, a first hydraulic cylinder, a first horizontal arm, a first slide rail, a third slewing mechanism, a second hydraulic cylinder, a first vertical arm, a third hydraulic cylinder, a first ball joint, and a first telescopic arm comprising a first section, a second section and a third section, wherein the second slewing mechanism is welded to the first slewing mechanism; the welding connection has a high strength and a good sealing effect, so that the slewing mechanisms are tightly connected, thereby ensuring the stability of the bridge detecting vehicle; the first support base is mounted on the second slewing mechanism via a bolt; the bolted connection makes it easy for assembly and disassembly, makes it convenient to replace foldable arm assemblies during the repairing, has low cost and a reliable effect; the first support base and the first horizontal arm are connected through a revolute pair; further, first support base and the first horizontal arm are connected through a revolute pair of a rolling bearing type which has a small friction and is capable of moving flexibly, contributing to the flexible up and down movements of the first horizontal arm; the first slide rail is connected to an inner side of the first horizontal arm via a bolt; the first vertical arm is connected to the first horizontal arm through the third slewing mechanism; the first section is connected to the first vertical arm via the first ball joint, so that the first section is capable of rotating at any angle; the first section, the second section and the third section are successively connected to form the first telescopic arm and are controlled to slide into one another through a hydraulic cylinder;

the second foldable arm assembly comprises a fourth slewing mechanism, a second support base, a fourth hydraulic cylinder, a second horizontal arm, a second slide rail, a fifth slewing mechanism, a fifth hydraulic cylinder, a second vertical arm, a sixth hydraulic cylinder, a second ball joint, and a second telescopic arm comprising a fourth section, a fifth section, and a sixth section, wherein the fourth slewing mechanism is welded to the first slewing mechanism; the welding connection has a high strength and a good sealing effect, so that the slewing mechanisms are tightly connected, thus ensuring the stability of the bridge detecting vehicle; the second support base is mounted on the fourth slewing mechanism via a bolt; the bolted connection makes it easy for assembly and disassembly, makes it convenient to replace foldable arm assemblies during the repairing, has low cost and a reliable effect; the second support base and the second horizontal arm are connected through a revolute pair; further, the second support base and the second horizontal arm are connected through a revolute pair of a rolling bearing type which has a small friction and is capable of moving flexibly, contributing to the flexible up and down movements of the second horizontal arm; the second slide rail is connected to an inner side of the second horizontal arm via a bolt; the second vertical arm is connected to the second horizontal arm through the fifth slewing mechanism; the fourth section is connected to the second vertical arm via the second ball joint, so that the fourth section is capable of rotating at any angle; the fourth section, the fifth section and the sixth section are successively connected to form the second telescopic arm and are controlled to slide into one another through a hydraulic cylinder;

the crossed arm comprises a first telescopic rod and a second telescopic rod; wherein one end of each of the first telescopic rod and the second telescopic rod is extended or retracted via a hydraulic cylinder; the first telescopic rod and the second telescopic rod are crossed via a revolute pair; four endpoints of the crossed arm are arranged on the first slide rail and the second slide rail; one of the four endpoints is fixed at the first slide rail or the second slide rail, and the other three of the four endpoints are capable of sliding on the first slide rail and the second slide rail; therefore, the second slewing mechanism and the fourth slewing mechanism drive the first horizontal arm and the second horizontal arm to form an angle; the crossed arm is forced to slide to adjust the angle between the first horizontal arm and the second horizontal arm; the first horizontal arm and the second horizontal arm are restrained by the crossed arm when the two horizontal arms work at the same time, ensuring the stability of the first horizontal arm and the second horizontal arm during working;

the detecting device comprises a first rotating platform, a first detector, a second rotating platform and a second detector, wherein the first rotating platform is provided at a rear end of the third section, and the second rotating platform is provided at a rear end of the sixth section; the first detector is provided on the first rotating platform, and the second detector is provided on the second rotating platform; the first rotating platform and the second rotating platform allow the first detector and the second detector to rotate 360°; a first image acquisition device is provided on the first detector, and a second image acquisition device is provided on the second detector, so as to acquire information on a surface of the bridge.

In some embodiments, the revolute pair is a revolute pair of a rolling bearing type.

In some embodiments, the second slewing mechanism and the fourth slewing mechanism are driven to rotate by a hydraulic cylinder.

In some embodiments, a slider is respectively arranged at two ends of the first telescopic rod; and a slider is respectively arranged at two ends of the second telescopic rod.

In some embodiments, the third slewing mechanism and the first vertical arm are connected via a revolute pair; the fifth mechanism and the second vertical arm are connected via a revolute pair; the revolute pair is a revolute pair of a rolling bearing type.

In some embodiments, the first vertical arm is driven by the second hydraulic cylinder to move; and the second vertical arm is driven by the fifth hydraulic cylinder to move.

In some embodiments, one end of the first section is fixed to the first vertical arm, and one end of the fourth section is fixed to the second vertical arm.

In some embodiments, each of the first ball joint and the second ball joint comprises a ball cup and a ball head capable of rotating in the ball cup.

In some embodiments, the first rotating platform and the second rotating platform are respectively driven by an electric motor to rotate.

The disclosure has the following beneficial effects.

The bridge detecting vehicle of the present disclosure includes two foldable arm assemblies, which has a higher working efficiency than the bridge detecting vehicle with the single foldable arm assembly. The second and fourth slewing mechanisms are mounted on the first slewing mechanism, which enables two horizontal arms to work independently, so that two or more positions can be detected simultaneously. When the two horizontal arms are driven by the second and fourth slewing mechanisms to form a certain angle, the crossed arm, provided between the two horizontal arms, can be driven to slide to adjust the angle between the two horizontal arms, ensuring the stability of the two horizontal arms when the two horizontal arms work simultaneously. The telescopic arms and the vertical arms are connected via ball joints, so that positions which are hard to be detected can be detected. The rotating platforms are provided at rear ends of the telescopic arms, so that the detecting device can rotate 360. The image acquisition devices are provided on the detectors to achieve an overall detection, improving the work efficiency, providing a safe and convenient use. In addition, the bridge detecting vehicle has low cost.

Figure 1:
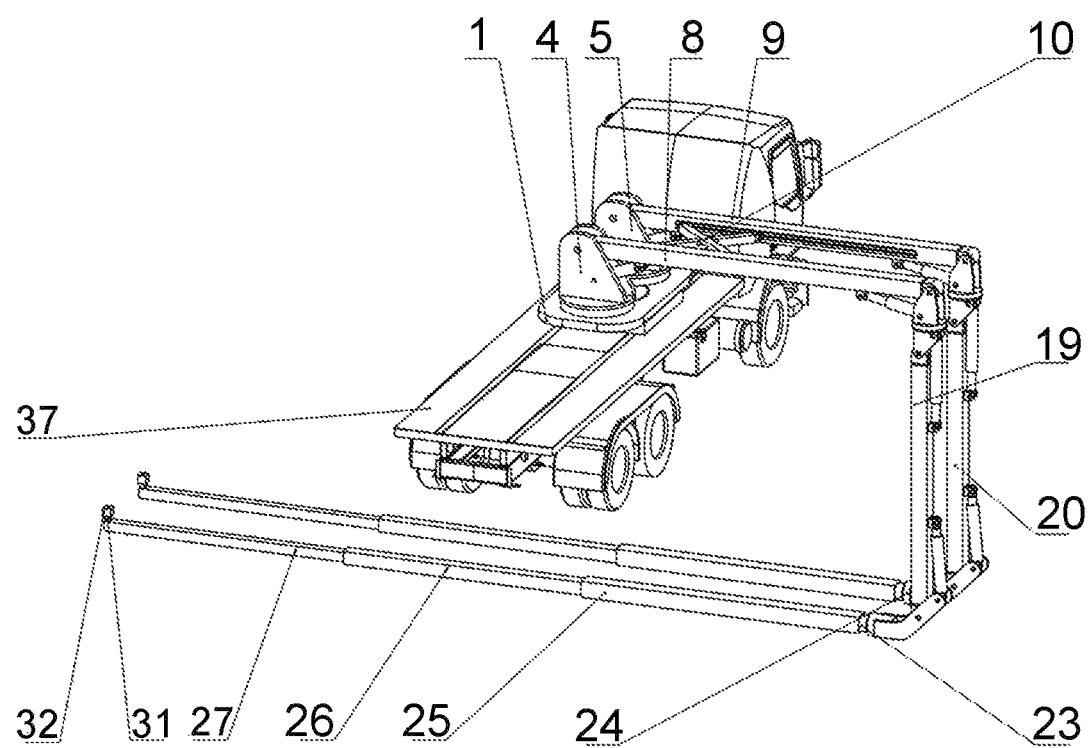
FIG. 1 is a schematic diagram of a bridge detecting vehicle with two foldable arms according to an embodiment of the present disclosure, in which the bridge detecting vehicle is unfolded.

In the drawings, 1—first slewing mechanism; 2—second slewing mechanism; 3—fourth slewing mechanism; 4—first support base; 5—second support base; 6—first hydraulic cylinder; 7—fourth hydraulic cylinder; 8—first horizontal arm; 9—second horizontal arm; 10—crossed arm; 11—first telescopic rod; 12—second telescopic rod; 13—first slide rail; 14—second slide rail; 15—fourth slewing mechanism; 16—fifth slewing mechanism; 17—second hydraulic cylinder; 18—fifth hydraulic cylinder; 19—first vertical arm; 20—second vertical arm; 21—third hydraulic cylinder; 22—sixth hydraulic cylinder; 23—first ball joint; 24—second ball joint; 25—first section; 26—second section; 27—third section; 28—fourth section; 29—fifth section; 30—sixth section; 31—first rotating platform; 32—first detector, 33—second rotating platform; 34—second detector; 35—first image acquisition device; 36—second image acquisition device; 37—vehicle body; 38—first foldable arm assembly; 39—second foldable arm assembly; 40—detecting device; 431—ball head; 432—ball cup.

DETAILED DESCRIPTION OF EMBODIMENTS

This application will be further described below with reference to the embodiments and accompanying drawings.

As shown in FIGS. 1-4 and 5A-C, the disclosure provides a bridge detecting vehicle with two foldable arms, including: a vehicle body 37, a first slewing mechanism 1, a first foldable arm assembly 38, a second foldable arm assembly 39, a crossed arm 10, and a detecting device 40.

The first slewing mechanism 1 is mounted on one side of a chassis of the vehicle body 37, close to a front of the vehicle body 37, through bolted connection, so as to allow the folded foldable arm assemblies to be placed at the chassis of the vehicle body 37, and prevent the folded foldable arm assemblies from interfering an anti-overturn device.

The first foldable arm assembly 38 includes a second slewing mechanism 2, a first support base 4, a first hydraulic cylinder 6, a first horizontal arm 8, a first slide rail 13, a third slewing mechanism 15, a second hydraulic cylinder 17, a first vertical arm 19, a third hydraulic cylinder 21, a first ball joint 23, and a first telescopic arm including a first section 25, a second section 26 and a third section 27. The second slewing mechanism 2 is welded to the first slewing mechanism 1. The welding connection has a high strength and a good sealing effect, so that the slewing mechanisms are tightly connected, thereby ensuring the stability of the bridge detecting vehicle. The first support base 4 is mounted on the second slewing mechanism 2 via a bolt. The bolted connection makes it easy for assembly and disassembly, makes it convenient to replace foldable arm assemblies during the repairing, has low cost and a reliable effect. The first support base 4 and the first horizontal arm 8 are connected through a revolute pair. The revolute pair is a revolute pair of a rolling bearing type which has a small friction and is capable of moving flexibly, contributing to the flexible up and down movements of the first horizontal arm 8. In addition, it is convenient to maintain the revolute pair. The first slide rail 13 is connected to an inner side of the first horizontal arm 8 via a bolt. The first vertical arm 19 is connected to the first horizontal arm 8 through the third slewing mechanism 15. The first section 25 is connected to the first vertical arm 19 via the first ball joint 23, so that the first section 25 is capable of rotating at any angle. The first section 25, the second section 26 and the third section 27 are successively connected to form the first telescopic arm and are controlled to slide into one another through a hydraulic cylinder.

Figure 2:
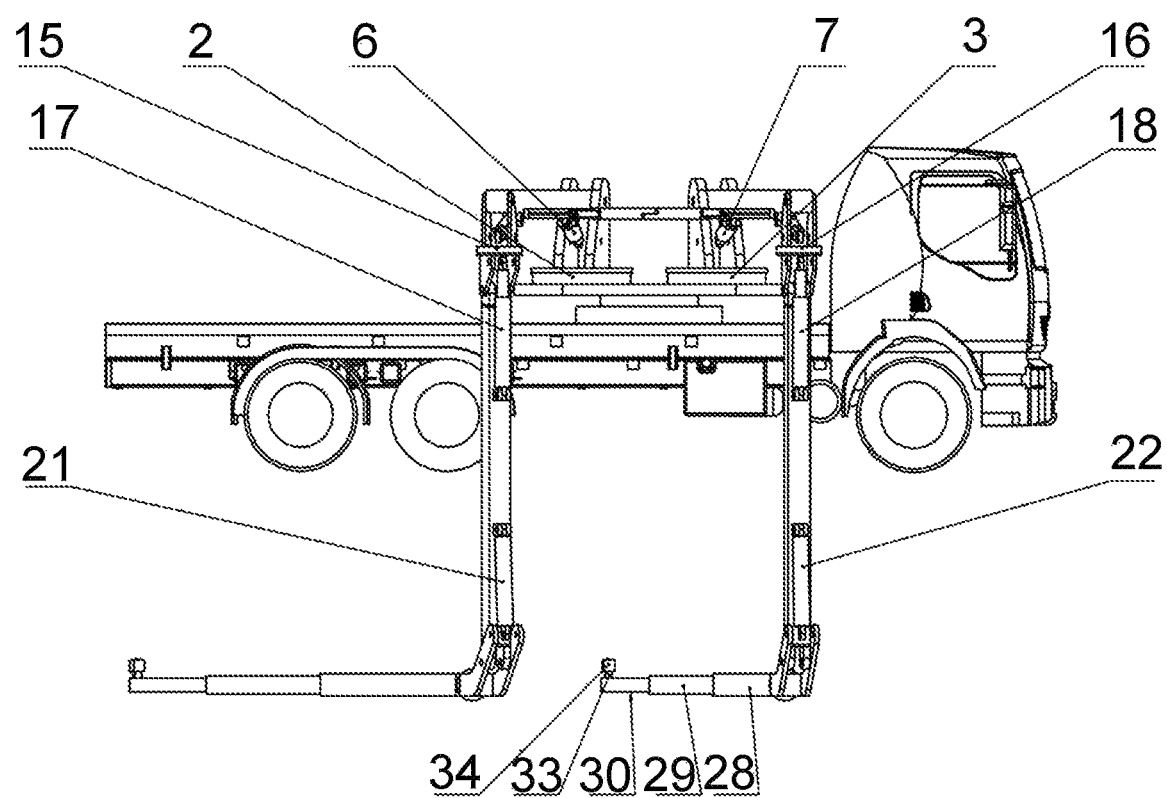
FIG. 2 is a schematic diagram of the bridge detecting vehicle according to an embodiment of the present disclosure, in which a certain angle is formed between a first horizontal arm and a second horizontal am.
Figure 3:
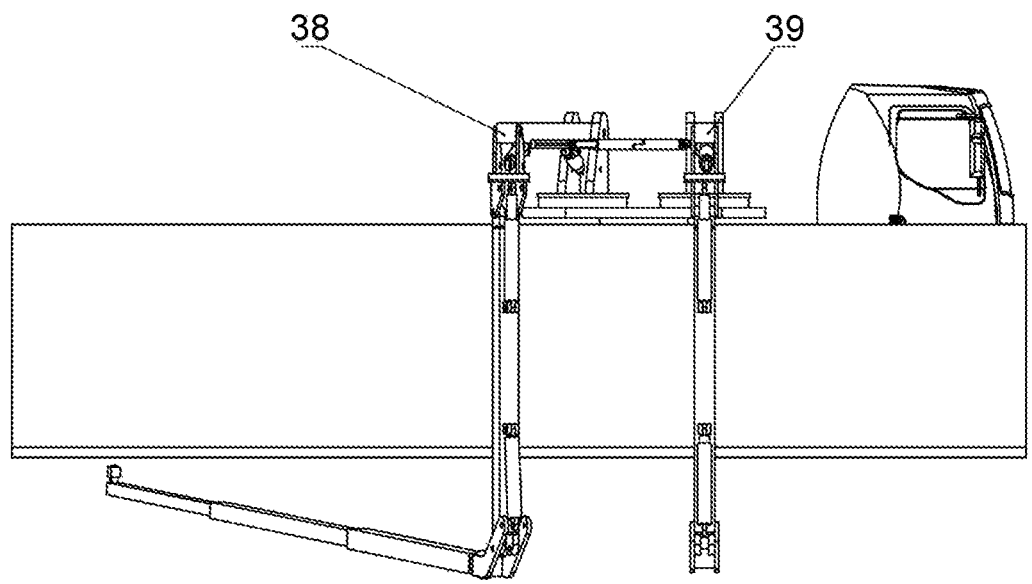
FIG. 3 schematically shows the bridge detecting vehicle according to an embodiment of the present disclosure, in which a single arm is working.
Figure 4:
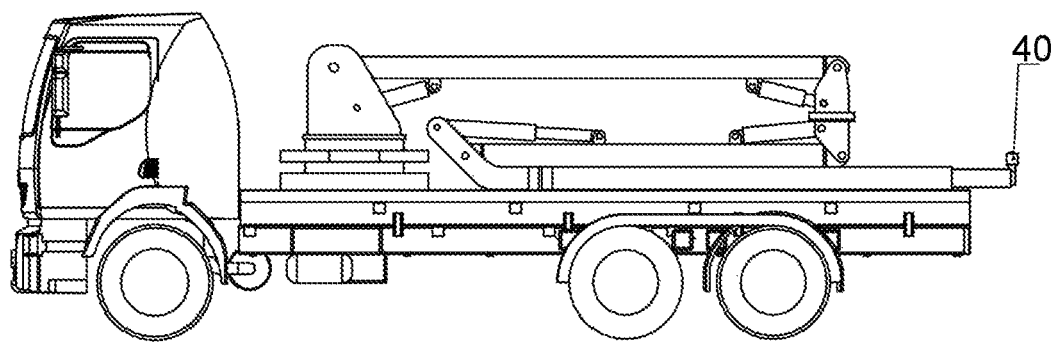
FIG. 4 is a schematic diagram of the bridge detecting vehicle according to an embodiment of the present disclosure, in which the bridge detecting vehicle is folded.
Figure 5A:
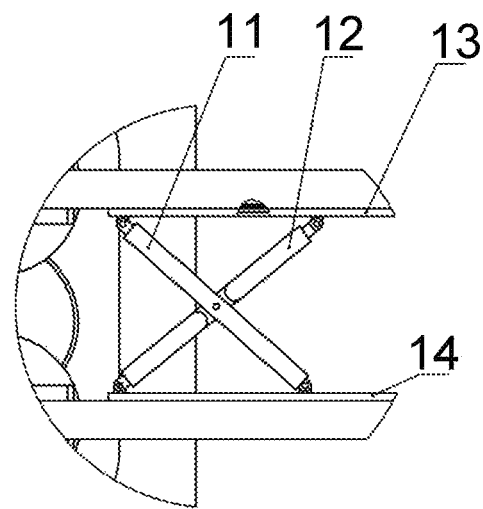
FIG. 5A is an enlarged partial view of a crossed arm of the bridge detecting vehicle according to an embodiment of the present disclosure.
Figure 5B:
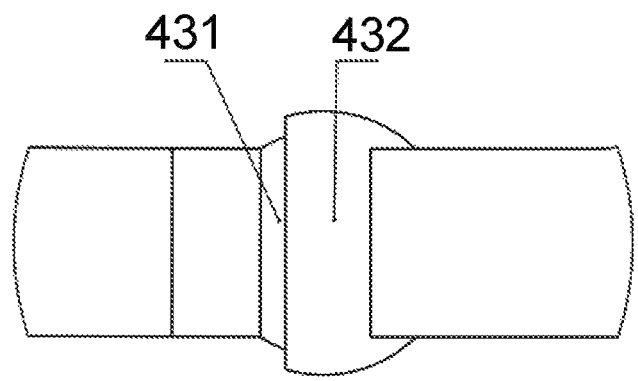
FIG. 5B is an enlarged partial view of a ball joint of the bridge detecting vehicle according to an embodiment of the present disclosure.
Figure 5C:
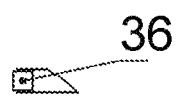
FIG. 5C is an enlarged partial view of an image acquisition device of the bridge detecting vehicle according to an embodiment of the present disclosure.
Figure 5C:
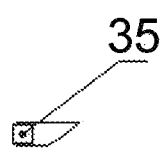

As shown in FIGS. 1-3, the second foldable arm assembly 39 includes a fourth slewing mechanism 3, a second support base 5, a fourth hydraulic cylinder 7, a second horizontal arm 9, a second slide rail 14, a fifth slewing mechanism 16, a fifth hydraulic cylinder 18, a second vertical arm 20, a sixth hydraulic cylinder 22, a second ball joint 24, and a second telescopic arm including a fourth section 28, a fifth section 29 and a sixth section 30. The fourth slewing mechanism 3 is welded to the first slewing mechanism 1. The welding connection has a high strength and a good sealing effect, so that the slewing mechanisms are tightly connected, thus ensuring the stability of the bridge detecting vehicle. The second support base 5 is mounted on the fourth slewing mechanism 3 via a bolt. The bolted connection makes it easy for assembly and disassembly, makes it convenient to replace foldable arm assemblies during the repairing, has low cost and a reliable effect. The second support base 5 and the second horizontal arm 9 are connected through a revolute pair. The revolute pair is a revolute pair of a rolling bearing type which has a small friction and is capable of moving flexibly, contributing to the flexible up and down movements of the second horizontal arm 9. In addition, it is convenient to maintain the revolute pair. The second slide rail 14 is connected to an inner side of the second horizontal arm 9 via a bolt. The second vertical arm 20 is connected to the second horizontal arm 9 through the fifth slewing mechanism 16. The fourth section 28 is connected to the second vertical arm 20 via the second ball joint 24, so that the fourth section 28 is capable of rotating at any angle. The fourth section 28, the fifth section 29 and the sixth section 30 are successively connected to form the second telescopic arm and are controlled to slide into one another through a hydraulic cylinder.

Each of the first ball joint and the second ball joint comprises a ball cup 432 and a ball head 431 capable of rotating in the ball cup 432. The first rotating platform and the second rotating platform are respectively driven by an electric motor to rotate.

As shown in FIGS. 1, 2 and 5, the crossed arm 10 includes a first telescopic rod 11 and a second telescopic rod 12. One end of each of the first telescopic rod 11 and the second telescopic rod 12 is extended or retracted via a hydraulic cylinder. The first telescopic rod 11 and the second telescopic rod 12 are crossed via a revolute pair. Four endpoints of the crossed arm 10 are arranged on the first slide rail 13 at the inner side of the first horizontal arm 8 and the second slide rail 14 at the inner side of the second horizontal arm 9. One of the four endpoints is fixed at the first slide rail 13 or the second slide rail 14, and the other three of the four endpoints are capable of sliding on the first slide rail 13 and the second slide rail 14. Therefore, the second slewing mechanism 2 and the fourth slewing mechanism 3 drive the first horizontal arm 8 and the second horizontal arm 9 to form an angle. The crossed arm 10 is forced to slide to adjust the angle between the first horizontal arm 8 and the second horizontal arm 9. The first horizontal arm 8 and the second horizontal arm 9 are restrained by the crossed arm 10 when the two horizontal arms work at the same time, ensuring the stability of the first horizontal arm 8 and the second horizontal arm 9 during working.

The detecting device 40 includes a first rotating platform 31, a first detector 32, a second rotating platform 33 and a second detector 34. The first rotating platform 31 is provided at a rear end of the third section 27, and the second rotating platform 33 is provided at a rear end of the sixth section 30. The first detector 32 is provided on the first rotating platform 31, and the second detector 34 is provided on the second rotating platform 33. The first rotating platform 31 and the second rotating platform 33 allow the first detector 32 and the second detector 34 to rotate 360°. A first image acquisition device 35 is provided on the first detector 32, and a second image acquisition device 36 is provided on the second detector 34, so as to acquire information on a surface of the bridge.

The embodiments are merely illustrative, and are not intended to limit the disclosure. Any equivalent substitutions and modifications made without departing from the spirit of the disclosure should fall within the scope of the disclosure.

What is claimed is:

1. A bridge detecting vehicle with two foldable arms, comprising:
    a vehicle body;
    a first slewing mechanism;
    a first foldable arm assembly;
    a second foldable arm assembly;
    a crossed arm; and
    a detecting device;
    wherein the first slewing mechanism is arranged on one side of a chassis of the vehicle body, close to a front of the vehicle body, through bolted connection;
    the first foldable arm assembly comprises a second slewing mechanism, a first support base, a first hydraulic cylinder, a first horizontal arm, a first slide rail, a third slewing mechanism, a second hydraulic cylinder, a first vertical arm, a third hydraulic cylinder, a first ball joint, and a first telescopic arm comprising a first section, a second section and a third section; wherein the second slewing mechanism is welded to the first slewing mechanism; the first support base is mounted on the second slewing mechanism via a bolt; the first support base and the first horizontal arm are connected through a revolute pair; the first slide rail is connected to an inner side of the first horizontal arm via a bolt; the first vertical arm is connected to the first horizontal arm through the third slewing mechanism; the first section is connected to the first vertical arm via the first ball joint; the first section, the second section and the third section are successively connected to form the first telescopic arm and are controlled to slide into one another through a hydraulic cylinder;
    the second foldable arm assembly comprises a fourth slewing mechanism, a second support base, a fourth hydraulic cylinder, a second horizontal arm, a second slide rail, a fifth slewing mechanism, a fifth hydraulic cylinder, a second vertical arm, a sixth hydraulic cylinder, a second ball joint, and a second telescopic arm comprising a fourth section, a fifth section, and a sixth section; wherein the fourth slewing mechanism is welded on the first slewing mechanism; the second support base is provided on the fourth slewing mechanism via a bolt; the second support base and the second horizontal arm are connected through a revolute pair; the second slide rail is connected to an inner side of the second horizontal arm via a bolt; the second vertical arm is connected to the second horizontal arm through the fifth slewing mechanism; the fourth section is connected to the second vertical arm via the second ball joint; the fourth section, the fifth section and the sixth section are successively connected to form the second telescopic arm and are controlled to slide into one another through a hydraulic cylinder;
    the crossed arm comprises a first telescopic rod and a second telescopic rod; wherein one end of each of the first telescopic rod and the second telescopic rod is controlled to be extended or retracted through a hydraulic cylinder; the first telescopic rod and the second telescopic rod are crossed via a revolute pair; four endpoints of the crossed arm are arranged on the first slide rail at the inner side of the first horizontal arm and the second slide rail at the inner side of the second horizontal arm; one of the four endpoints is fixed at any one of the first slide rail and the second slide rail, and the other three of the four endpoints are capable of sliding on the first slide rail and the second slide rail; and
    the detecting device comprises a first rotating platform, a first detector, a second rotating platform and a second detector, wherein the first rotating platform and the second rotating platform are respectively arranged at a rear end of the third section and a rear end of the sixth section; the first detector and the second detector are respectively provided on the first rotating platform and the second rotating platform; the first detector and the second detector are respectively provided with a first image acquisition device and a second image acquisition device.

2. The bridge detecting vehicle of claim 1, wherein the first support base and the second support base are respectively connected to the first horizontal arm and the second horizontal arm through a revolute pair of a rolling bearing type.

3. The bridge detecting vehicle of claim 1, wherein the second slewing mechanism and the fourth slewing mechanism are driven by a hydraulic cylinder to rotate.

4. The bridge detecting vehicle of claim 1, wherein a slider is respectively arranged at two ends of the first telescopic rod; and a slider is respectively arranged at two ends of the second telescopic rod.

5. The bridge detecting vehicle of claim 1, wherein the third slewing mechanism and the first vertical arm are connected via revolute pair of a rolling bearing type.

6. The bridge detecting vehicle of claim 1, wherein the first vertical arm is driven by the second hydraulic cylinder to move; and the second vertical arm is driven by the fifth hydraulic cylinder to move.

7. The bridge detecting vehicle of claim 1, wherein each of the first ball joint and the second ball joint comprises a ball cup and a ball head capable of rotating in the ball cup.

8. The bridge detecting vehicle of claim 1, wherein one end of the first section is fixed to the first vertical arm, and one end of the fourth section is fixed to the second vertical arm.

9. The bridge detecting vehicle of claim 1, wherein the first rotating platform and the second rotating platform are respectively driven by an electric motor to rotate.

* * * * *